(12) United States Patent
Moussakhani (10) Patent No.: US 11,888,216 B2
(45) Date of Patent: *Jan. 30, 2024

(54) WEARABLE ANTENNA AND WEARABLE DEVICE

(71) Applicant: GOOGLE LLC, Mountain View, CA (US)

(72) Inventor: Kaveh Moussakhani, Kitchener (CA)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/867,377

(22) Filed: Jul. 18, 2022

(65) Prior Publication Data

US 2022/0359979 A1 Nov. 10, 2022

Related U.S. Application Data

(63) Continuation of application No. 16/789,886, filed on Feb. 13, 2020, now Pat. No. 11,411,304.

(Continued)

(51) Int. Cl.
| | |
|---|---|
| *H01Q 1/27* | (2006.01) |
| *H01Q 1/38* | (2006.01) |
| *H01Q 1/40* | (2006.01) |
| *H01Q 1/44* | (2006.01) |
| *H01Q 1/24* | (2006.01) |
| *H01Q 13/10* | (2006.01) |
| *H01Q 21/00* | (2006.01) |
| *H04B 1/3827* | (2015.01) |

(Continued)

(52) U.S. Cl.
CPC .............. *H01Q 1/273* (2013.01); *G06F 1/163* (2013.01); *H01Q 1/243* (2013.01); *H01Q 1/38* (2013.01); *H01Q 1/40* (2013.01); *H01Q 1/44* (2013.01); *H01Q 9/0457* (2013.01); *H01Q 13/106* (2013.01); *H01Q 21/0075* (2013.01); *H04B 1/385* (2013.01); *H04B 2001/3861* (2013.01)

(58) Field of Classification Search
CPC .......... H01Q 1/273; H01Q 1/243; H01Q 1/38; H01Q 1/40; H01Q 1/44; H01Q 9/0457; H01Q 13/106; H01Q 21/0075; H01Q 9/045; G06F 1/163; G06F 1/1698; H04B 1/385; H04B 2001/3861
See application file for complete search history.

(56) References Cited

U.S. PATENT DOCUMENTS

| 5,646,634 A * | 7/1997 | Bokhari ................. H01Q 1/273 343/718 |
| 2004/0090366 A1 * | 5/2004 | Wong ..................... H01Q 5/371 343/700 MS |

(Continued)

*Primary Examiner* — David E Lotter (57) ABSTRACT

A wearable device includes a wearable body that in use is worn on or proximate a skin of a wearer and a wearable antenna embedded in the wearable body and insulated from the wearable body. The wearable antenna includes a microwave dielectric substrate having a first major surface, a second major surface opposed to the first major surface, and a relative permittivity of at least 90. An electrically conductive patch is disposed on the first major surface, a feed line is connected to a feed point of the electrically conductive patch, and an electrically conductive ground plane is disposed on a far side of the second major surface relative to the first major surface.

19 Claims, 8 Drawing Sheets

Related U.S. Application Data

(60) Provisional application No. 62/805,615, filed on Feb. 14, 2019.

(51) Int. Cl.
*G06F 1/16* (2006.01)
*H01Q 9/04* (2006.01)

(56) References Cited

U.S. PATENT DOCUMENTS

| | | | |
|---|---|---|---|
| 2014/0078007 A1* | 3/2014 | Abe | H01Q 9/0471 343/702 |
| 2016/0218419 A1* | 7/2016 | Vance | H01Q 1/241 |
| 2018/0205138 A1* | 7/2018 | Osawa | G04R 60/10 |
| 2020/0227821 A1* | 7/2020 | Wu | H01Q 1/38 |

* cited by examiner

WEARABLE ANTENNA AND WEARABLE DEVICE

CROSS-REFERENCE TO RELATED APPLICATIONS

The present application is a continuation application of U.S. patent application Ser. No. 16/789,886, entitled "WEARABLE ANTENNA AND WEARABLE DEVICE" and filed on Feb. 13, 2020, which claims priority to U.S. Provisional Application Ser. No. 62/805,615, entitled "WEARABLE ANTENNA AND WEARABLE DEVICE" and filed on Feb. 14, 2019, the entirety of which is incorporated by reference herein.

TECHNICAL FIELD

The disclosure relates to antenna design for wearables.

BACKGROUND

Wearable devices, or simply wearables, are electronic devices that can be incorporated into clothing or worn on the body. Examples of wearables include smart watches, fitness tracker wristbands, smart glasses, earbuds, smart textiles, and the like. Wearables may include microcontrollers and/or may include antennas for wireless communication with other devices.

Design of antennas for wearables is challenging due to various factors. For example, the human body is lossy and electrically conductive. Thus, the body can have a significant effect on the performance of the antenna when the antenna is in close proximity to the skin or in direct contact with skin. The antenna design should account for this effect. Space is extremely limited in wearables so that very little volume is allowed for placement of subsystems and antennas. Thus, the antenna design needs to be as small as possible while mitigating the body effects—often, these requirements are conflicting. A wearable designer may wish to use metal or other high conductivity material as part of the body of the wearable, e.g., in order to give the wearable an appearance of luxury or to make the wearable more durable. Metal housing typically poses additional challenges to designing of the antenna.

SUMMARY

In a first aspect, a wearable antenna may be summarized as including a microwave dielectric substrate having a first major surface and a second major surface, the second major surface opposed to the first major surface across a dimension of the microwave dielectric substrate, the microwave dielectric substrate having a relative permittivity of at least 90; an electrically conductive patch disposed on the first major surface of the microwave dielectric substrate, the electrically conductive patch having a feed point; a feed line connected to the feed point of the electrically conductive patch; and an electrically conductive ground plane disposed on a far side of the second major surface relative to the first major surface of the microwave dielectric substrate.

Variants of the wearable antenna according to the first aspect may further include one or more of the features described in A1 to A10 in any combination.

A1: The microwave dielectric substrate may be a microwave dielectric substrate.

A2: The microwave dielectric substrate may have a relative permittivity in a range from 90 to 120. Alternatively, the microwave dielectric substrate may have a relative permittivity in a range from 100 to 120.

A3: The feed line may be a microstrip feed line.

A4: The patch may include a U-shaped slot.

A5: The microwave dielectric substrate may have a width in a range from 2 mm to 8 mm and a length in a range from 2 mm to 8 mm.

A6: The wearable antenna may operate at a frequency in a range from 2.4 to 2.48 GHz.

A7: The first and second major surfaces of the microwave dielectric substrate may be planar. Alternatively, the first and second major surfaces of the microwave dielectric substrate may be curved.

A8: The microwave dielectric substrate, the patch, and the ground plane may be enclosed in a container made of an electrically non-conductive material.

A9: An electrically conductive coating film may be disposed on exposed surfaces of at least the patch and the ground plane.

A10: The ground plane may be carried on the second major surface of the microwave dielectric substrate.

In a second aspect, a wearable device may be summarized as including a wearable body that in use is worn on or proximate a skin of a wearer and a wearable antenna according to the first aspect (or a variation thereof) embedded in the wearable body and insulated from the wearable body.

Variants of the wearable device according to the second aspect may further include one or more of the features described in A1 to A5 in any combination.

A1: The wearable body may have a ring shape.

A2: The wearable body may be made of metal or an alloy.

A3: The wearable body may have a cavity, and the wearable antenna may be disposed in the cavity. A cover may be mounted over an open end of the cavity to enclose the wearable antenna between the wearable body and the cover, where the cover is made of an electrically non-conductive material and is permeable to radio waves in at least an operation frequency range of the wearable antenna. The wearable antenna may be insulated from the wearable body by at least one of an electrically non-conductive material and an air gap. The wearable antenna may be retained on a surface of the wearable body exposed to the cavity by an electrically non-conductive material having adhesive properties.

A4: At least one input device may be carried by the wearable body. The at least one input device may be selected from a touchpad, a push button, and a joystick.

A5: A flexible printed circuit board may be disposed in the wearable body, where the wearable antenna is electrically coupled to the flexible printed circuit board.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale.

For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices and other wearable devices have not been shown or described in detail to avoid unnecessarily obscuring descriptions of the embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments.

Figure 1:
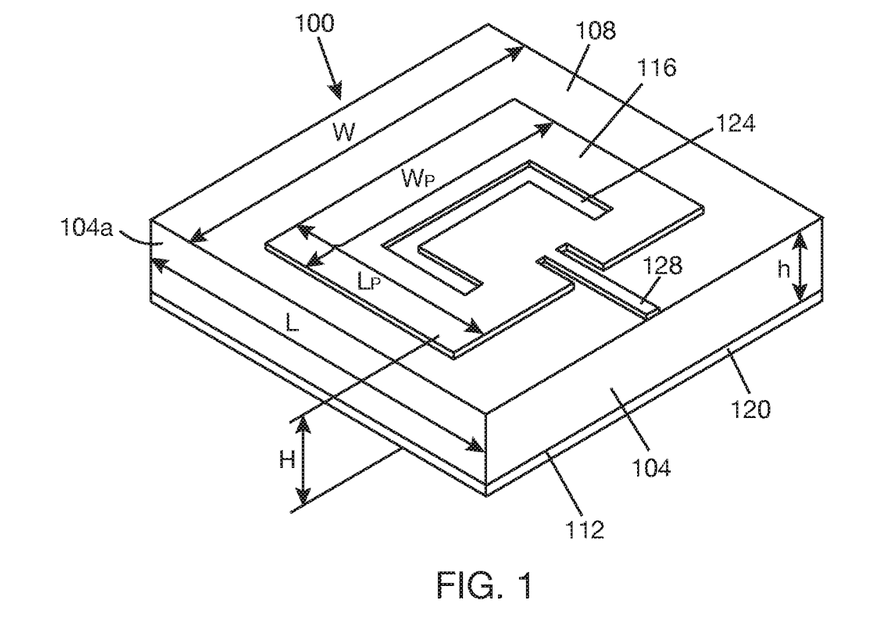
FIG. 1 is an isometric view of a planar wearable antenna.

FIG. 1 shows a wearable antenna 100 according to one illustrative implementation. Wearable antenna 100 is in a compact form that is suitable for use in wearables where space is a premium. For example, wearable antenna 100 may have a width W≤8 mm and a length L≤8 mm. The height (or thickness) H of wearable antenna 100 will typically be much smaller than either of the width W and length L of the wearable antenna 100. Wearable antenna 100 includes a microwave dielectric (e.g., ceramic) substrate 104 having a top surface 108, a bottom surface 112, a height h>0 between top and bottom surfaces 108, 112, and a relative permittivity $\varepsilon_r \geq 90$. In one example, the relative permittivity of microwave dielectric substrate 104 may be in a range from 90 to 120. In another example, the relative permittivity of microwave dielectric substrate 104 may be in a range from 100 to 120. In general, the bandwidth of the antenna will tend to decrease as the relative permittivity of the dielectric layer increases.

A patch 116 is disposed on the top surface 108 of microwave dielectric substrate 104, and a ground plane 120 is disposed underneath, e.g., carried on, the bottom surface 112 of microwave dielectric substrate 104. Patch 116 and ground plane 120 are therefore spaced apart by microwave dielectric substrate 104. Patch 116 is a thin sheet of electrically conductive material, typically a metal, e.g., copper. Ground plane 120 provides an electrically conducting surface that serves to reflect the electromagnetic energy from patch 116. Ground plane 120 may be a solid plate of electrically conductive material, typically a metal, e.g., copper, or a dielectric layer coated with electrically conductive material. Patch 116 may be fed by a feed line 128. In the illustrated example, feed line 128 is a microstrip that is connected to a feed point of patch 116. In other examples, feed line 128 may not be connected to a feed point of patch 116 and proximity coupling may be used to feed patch 116. In other examples, a feed line other than a microstrip feed line, e.g., a coaxial feed line or an aperture feed line, may be used. Electromagnetic energy received at wearable antenna 100 is first guided to the region underneath patch 116. This region acts as a resonant cavity with open circuits on the sides. Some of the energy leaks out of the cavity and radiates into space, resulting in an antenna.

Patch 116 and ground plane 120 may be disposed on respective surfaces 108, 112 of microwave dielectric substrate 104 by taping, with adhesive, by printing, or by other suitable method. In the illustrated example, patch 116 has a rectangular shape. However, other patch shapes are possible, such as square, triangular, circular, and the like. In one example, a U-shaped slot 124 is cut into patch 116 to control the electromagnetic radiation pattern from the antenna. The U-shaped slot 124 can have the effect of broadening the bandwidth of the antenna, which can compensate for some of the reduction in bandwidth due to a relatively high permittivity of the microwave dielectric substrate 104. Other types of slot geometries besides a U-shape are possible and may be used for a similar effect, such as L-shaped slot, H-slot, and V-slot. In other examples, two slots may be cut into patch 116, e.g., to enable a single-fed dual-band antenna. In other examples, a stack of patches may be disposed on the top surface 108 of microwave dielectric substrate 104, e.g., to enable a multi-fed multi-band antenna.

Patch 116 has length $L_P$ and width $W_P$. The length of ground plane 120 may be the same as length L of wearable antenna 100, and the width of ground plane 120 may be the same as width W of wearable antenna 100. Typically, the 2D size of patch 116, i.e., the product of width $W_P$ and length $L_P$ for a rectangular patch, will be smaller than the 2D size of ground plane 120, i.e., the product of width W and length L. Patch 116 sits on top of microwave dielectric substrate 104 having height h>0 and relative permittivity $\varepsilon_r \geq 90$. The parameters $L_P$, $W_P$, h, $\varepsilon_r$, and dimensions of the U-shaped slot 124 in patch 116 control the properties of wearable antenna 100. The height H of wearable antenna 100 is the sum of the height of patch 116, the height h of microwave dielectric substrate 104, and the height of ground plane 120. However, because the thickness of each of patch 116 and ground 120 is typically just a few microns, e.g., about 25 microns, the height H of wearable antenna 100 will be approximately the same as the height h of microwave dielectric substrate 104.

In some implementations that employ a substrate having a relative permittivity, $\varepsilon_r$, in the range of 90 to 120, higher antenna efficiency may be achieved by limiting the height of the substrate as described in Equation (1.1):

$$h < \frac{0.3}{2\pi\sqrt{\varepsilon_r}}\lambda \quad (1.1)$$

where h is height of the microwave dielectric substrate, $\lambda$ is free space wavelength, and $\varepsilon_r$ is relative permittivity of the microwave dielectric substrate. At an operating frequency of 2.4 GHZ, $\lambda$ is 0.125 m or 12.5 cm ($\lambda$=c/f, where c is the speed of light and f is operating frequency of the antenna). According to Equation (1.1), if $\varepsilon_r$=110, for example, h is recommended to be less than 0.57 mm. A height h≥0.57 mm may be selected for $\varepsilon_r$=110. However, this may excite surface wave on the patch and decrease antenna efficiency. In addition, for substrates having 90≤$\varepsilon_r$≤120 it can be advantageous to ensure that h is not much lower than hi given by Equation (1.2):

$$h_l = \frac{0.15}{2\pi\sqrt{\varepsilon_r}}\lambda \quad (1.2)$$

However, in other implementations (such as in implementations that employ a relative permittivity outside of the range of 90 to 120), the above guidelines for choosing substrate height may not apply. For example, in some implementations (e.g., in implementations employing a substrate having a higher relative permittivity, i.e., $\varepsilon_r$>120) higher antenna efficiencies may still be realized for substrate heights that exceed the limit described in equation 1.1 above. Generally, the height of the substrate (which may vary from sub-millimeter to multiple millimeters) may depend on available space and desired efficiency.

Wearable antenna 100 may be designed for operation in a frequency range of 2.4 to 2.48 GHz. In examples, for $\varepsilon_r$ in a range from 90 to 120, microwave dielectric substrate 104 may have a width W in a range from 2 mm to 8 mm, a length L in a range from 2 mm to 8 mm, and a height h as described above. In general, a higher width W will correspond to a lower length L, and vice versa, (e.g., W=2 mm×L=6 mm or L=2 mm×W=6 mm), except for when W=L.

EXAMPLE

Figure 2A:
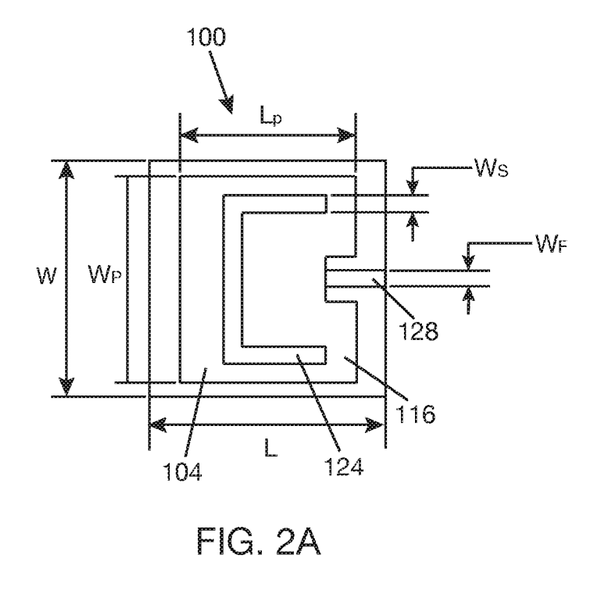
FIG. 2A is a top plan view of an example wearable antenna.
Figure 2B:
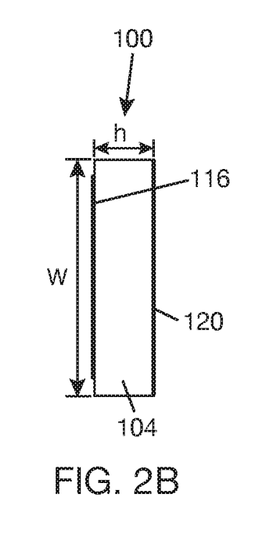
FIG. 2B is a side view of the example wearable antenna of FIG. 2A.

FIGS. 2A and 2B show a geometry of a wearable antenna configured for use at an operating frequency in a range from 2.4 GHz to 2.48 GHz. The wearable antenna includes a microwave dielectric (e.g., ceramic) substrate 104 having a relative permittivity of 110±3.0 (M110 microwave dielectric ceramic from Maruwa Co., Ltd., Aichi, Japan), a height h of approximately 0.5 mm, a length L of approximately 4 mm, and a width W of approximately 4 mm. A patch 116 made of copper is disposed on a first surface of the microwave dielectric substrate 104. The patch has a length $L_P$ of approximately 3 mm, a width $W_P$ of approximately 3.5 mm, and a thickness of approximately 25 microns. The patch has a U-shaped slot 124 with a width $W_S$ of approximately 0.3 mm. A ground plane 120 made of copper is disposed on a second surface of the microwave dielectric substrate. The ground plane has a length of approximately 4 mm, a width of approximately 4 mm, and thickness of approximately 25 microns. Feed line 128 connected to a feed point of the patch has a width $W_F$ of approximately 0.25 mm.

Figure 3:
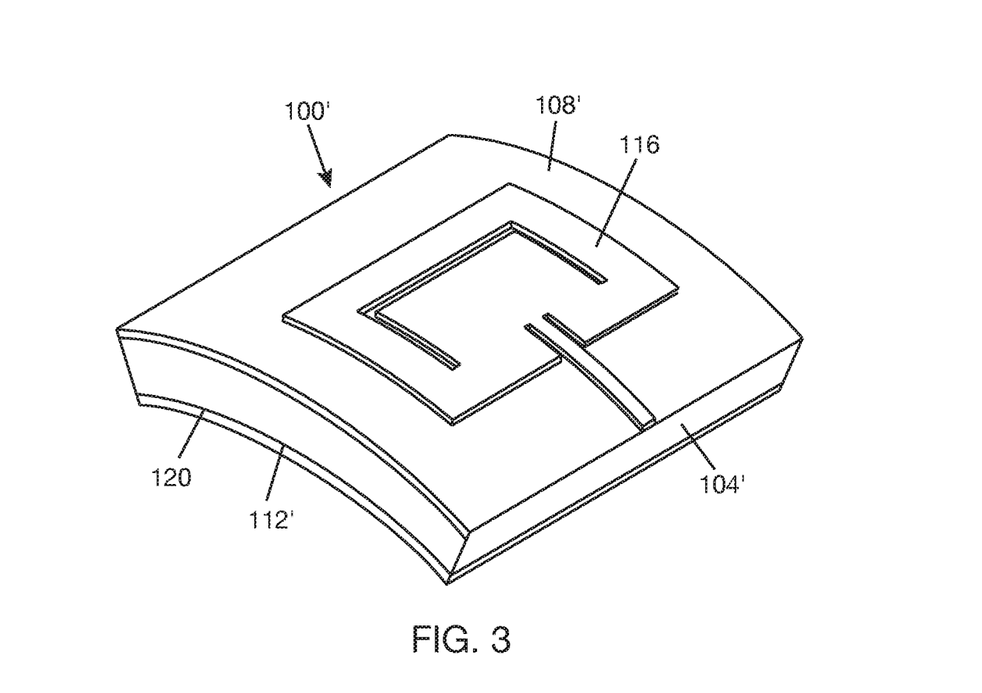
FIG. 3 is an isometric view of a curved wearable antenna.
Figure 4:
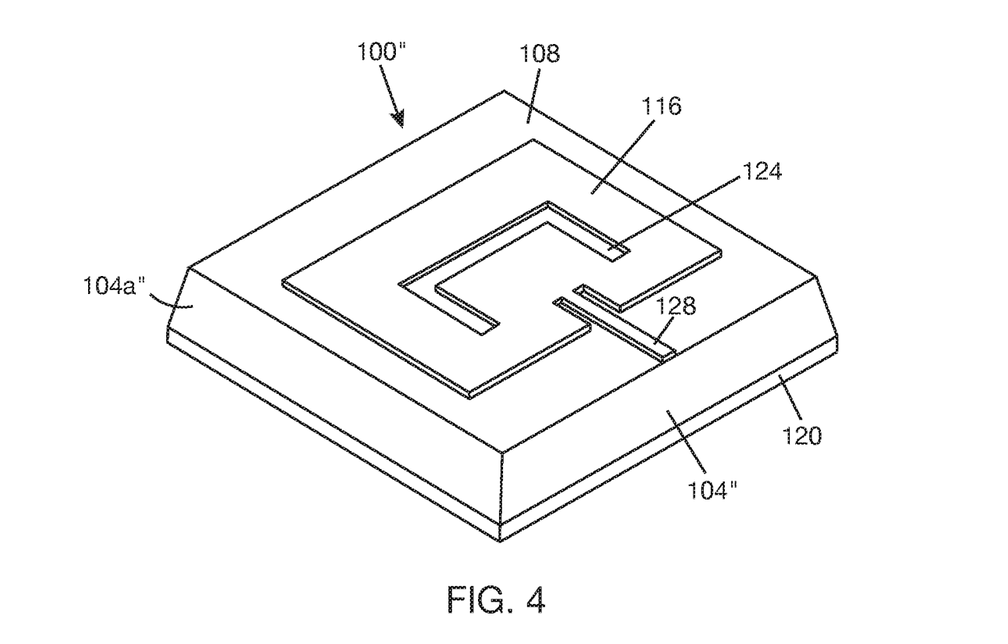
FIG. 4 is an isometric view of a planar wearable antenna where the dielectric substrate has tapered sides.

FIG. 1 shows wearable antenna 100 as a planar antenna, i.e., where top and bottom surfaces (e.g., opposed major surfaces) 108, 112 of microwave dielectric substrate 104 are planar and patch 116 and ground plane 120 conform to respective surfaces 108, 112. FIG. 3 shows wearable antenna 100' as a curved antenna, i.e., where top and bottom surfaces (e.g., opposed major surfaces) 108', 112' of microwave dielectric substrate 104' are curved or arcuate and patch 116 and ground plane 120 conform to respective surfaces 108', 112'. This will enable wearable antenna 100' to be conformed to a similarly curved surface. Typically, the curve is in one direction, i.e., a cylindrical profile. In FIG. 1, wearable antenna 100 is shown as having a square geometry, where length L and width W are approximately the same. In another example, wearable antenna 100 may have a rectangular geometry, where length L and width W are different. In yet another example, wearable antenna 100 may have a circular geometry. In FIG. 1, microwave dielectric substrate 104 has straight sides 104a—sides 104a are the surfaces extending between the perimeter of top surface 108 and the perimeter of bottom surface 112. In wearable antenna 100" shown in FIG. 4, microwave dielectric substrate 104" may have tapered sides 104a".

Figure 5:
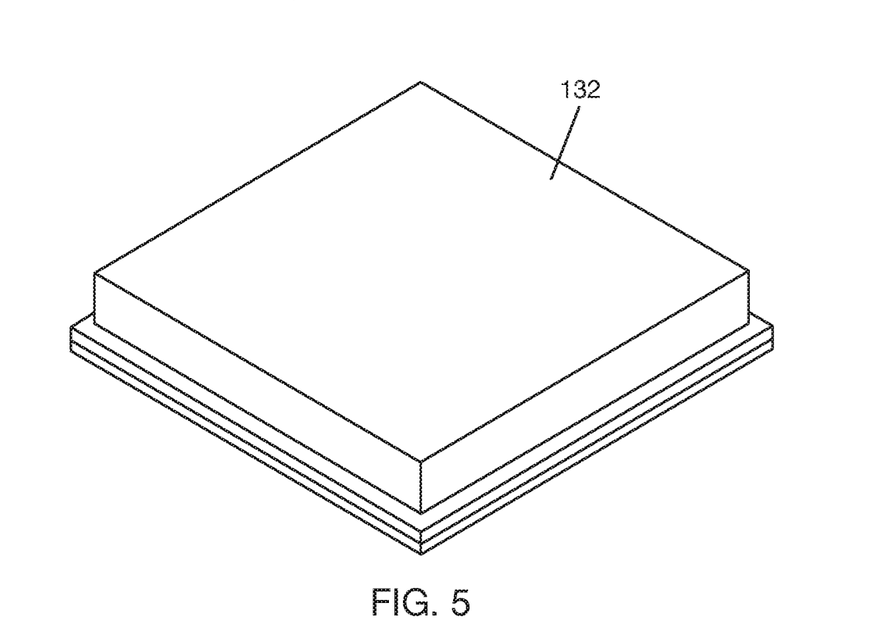
FIG. 5 is an isometric view of a container containing a wearable antenna.

Wearable antenna 100, or a variation thereof, may be disposed in a container 132 (in FIG. 5) made of an electrically non-conductive material, such as a plastic material. Container 132 may be a hard case, a poly bag, or other similar enclosure suitable for electronics. Container 132 may provide protection for wearable antenna 100, facilitate mounting of wearable antenna 100 in a wearable body, and insulate wearable antenna 100 from the surroundings. Alternatively, an electrically non-conductive coating may be applied on exposed surfaces of at least the patch 116 and the ground plane 120 or to all the exposed surfaces of wearable antenna 100, thereby forming an insulating layer around these surfaces.

Figure 6:
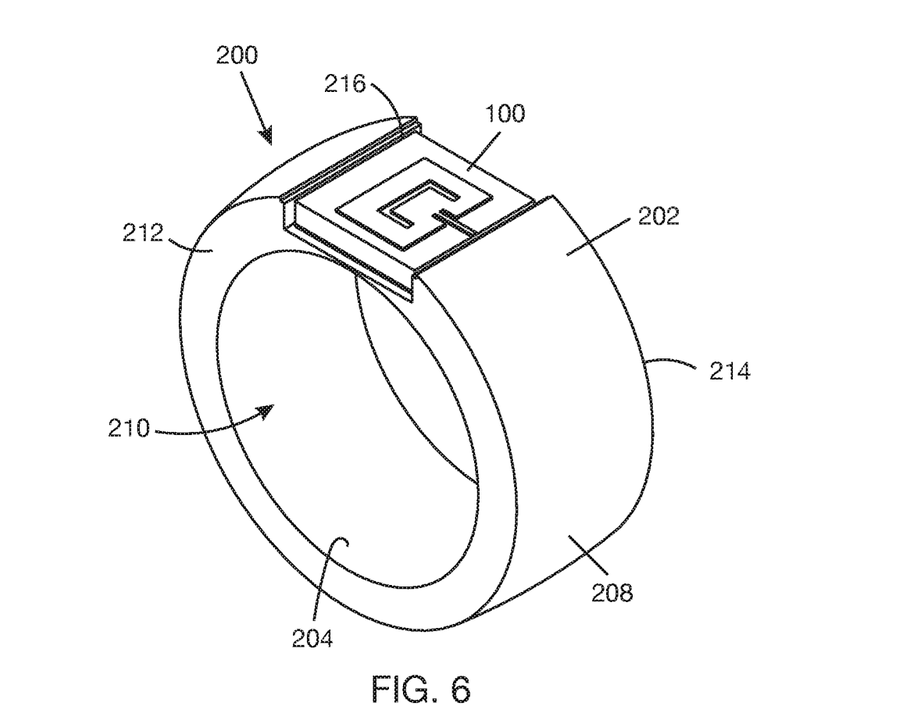
FIG. 6 is an isometric view of a wearable having a ring-shaped wearable body and a wearable antenna disposed in a cavity in the wearable body.

FIG. 6 shows a wearable device 200 including a wearable body 202 that may be worn on or proximate a skin of a wearer. Wearable antenna 100, or a variation thereof, is embedded in wearable body 202. In the illustrated example, wearable body 202 is in the form of a ring that may be worn on a finger of the wearer, such as on the index finger. Wearable body 202 has a ring shape defined by an inner surface 204, an outer surface 208, and end faces 212, 214. Inner surface 204 and outer surface 208 are radially spaced apart, and inner surface 204 defines an opening 210. Opening 210 may be sized to receive a finger, for example. End faces 212, 214 are axially spaced apart, and each of end faces 212, 214 extends between inner surface 204 and outer surface 208. Wearable body 202 may have a uniform radial thickness (i.e., the thickness between inner surface 204 and outer surface 208), or may have a non-uniform radial thickness—for example, select portions of wearable body 202 may be thicker to accommodate components of the wearable device 200. Inner surface 204 may not be perfectly circular (see, for example, FIG. 15 where portions of inner surface 204 are flat).

Figure 7:
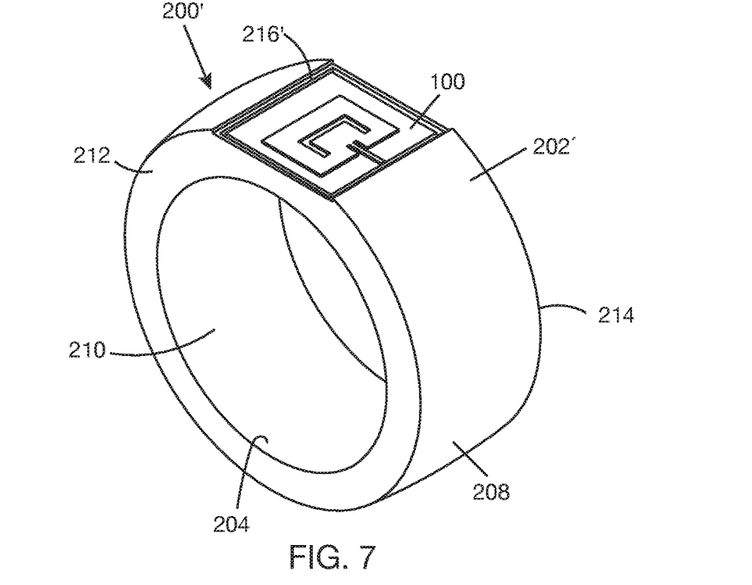
FIG. 7 is an isometric view of a wearable having a ring-shaped wearable body and a wearable antenna disposed in a cavity in the wearable body.

Wearable antenna 100 may be embedded in wearable body 202 by disposing wearable antenna 100 in a cavity 216 formed in wearable body 202. In FIG. 6, cavity 216 is open at end faces 212, 214 and at outer surface 208. FIG. 7 shows another variation where cavity 216' is closed at end faces 212, 214 but open at outer surface 208. Other cavity variations are possible. In the other variations, the cavity is preferably open at least at the outer surface 208.

Figure 8:
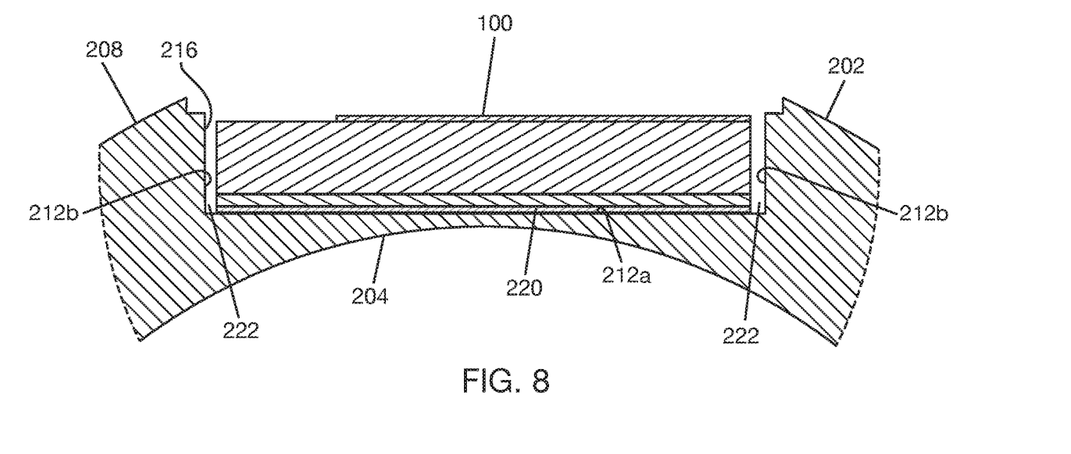
FIG. 8 is a cross-sectional view of a portion of a wearable body including a wearable antenna.

FIG. 8 shows wearable antenna 100 retained on a bottom surface 212a of cavity 212 by adhesive, e.g., via adhesive tape 220. In other examples, wearable antenna 100 may be retained on bottom surface 212a by a layer of adhesive material. Adhesive tape 220 may be a pressure-sensitive adhesive tape. Adhesive tape 220 or other adhesive material disposed between wearable antenna 100 and bottom surface 212a of cavity 212 may be electrically non-conductive to provide an electrically insulating layer between wearable antenna 100 and wearable body 202. Although not shown, wearable antenna 100 may be disposed in a container, as previously described (132 in FIG. 5), prior to being attached to bottom surface 212a of cavity 212 by adhesive tape 220 or other suitable adhesive material. FIG. 8 shows air gaps 222 between side surfaces 212b of cavity 212 and wearable antenna 100. Such air gaps may provide an insulating layer between the sides of wearable antenna 100 and adjacent surfaces of wearable body 202. If wearable antenna 100 is disposed in a container that is electrically non-conductive, the air gaps may be omitted.

Wearable antenna 100 is preferably insulated from wearable body 202, i.e., there are no electrically conductive paths between wearable antenna 100 and wearable body 202. Various measures may be used in any combination to insulate wearable antenna 100 from wearable body 202. These measures may include providing a layer of material that is electrically non-conductive between wearable antenna 100 and surrounding surfaces of wearable body 202, enclosing wearable antenna 100 in a container that is electrically non-conductive prior to disposing wearable antenna 100 in a cavity in the wearable body 202, and providing air gaps between surfaces of wearable antenna 100 that are in opposing relation to surfaces of wearable body 202. Insulating wearable antenna 100 from wearable body 202 will allow wearable antenna 100 to be designed without particular regard to the electrical conductivity of wearable body 202. This will expand the range of materials from which wearable body 202 can be made beyond electrically non-conductive materials such as plastics. In particular, it will be possible to make wearable body 202 from a metal or an alloy or a composite material including a metal or an alloy or other electrically conductive material without sacrificing the performance of the antenna.

Figure 9:
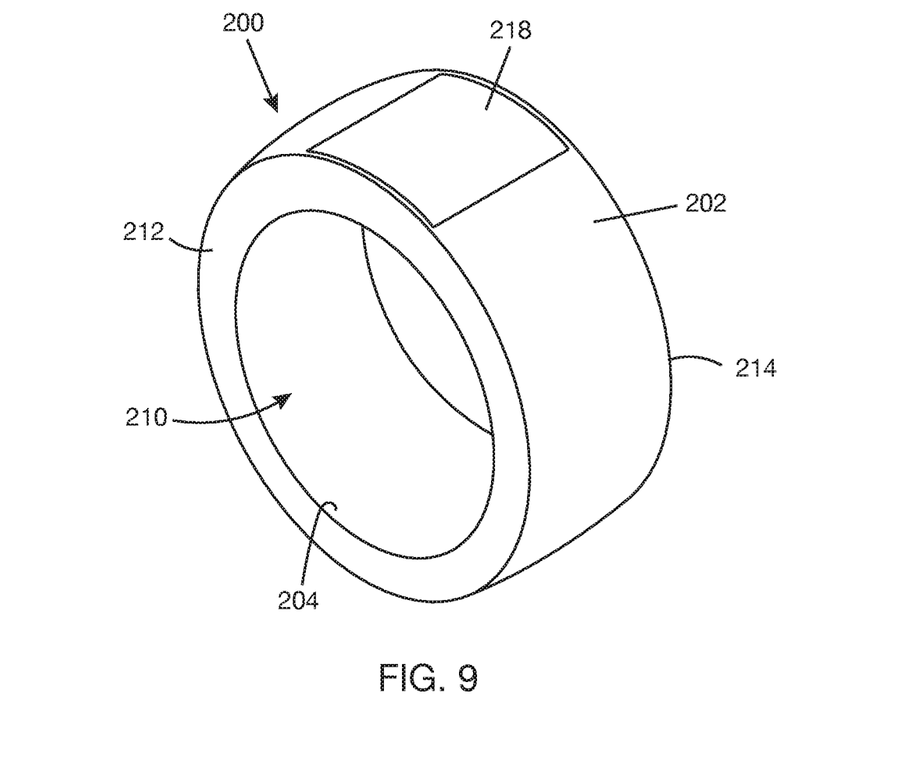
FIG. 9 is an isometric view of a wearable having a ring-shaped wearable body, a wearable antenna disposed in a cavity in the wearable body, and a cover mounted over the cavity.
Figure 10:
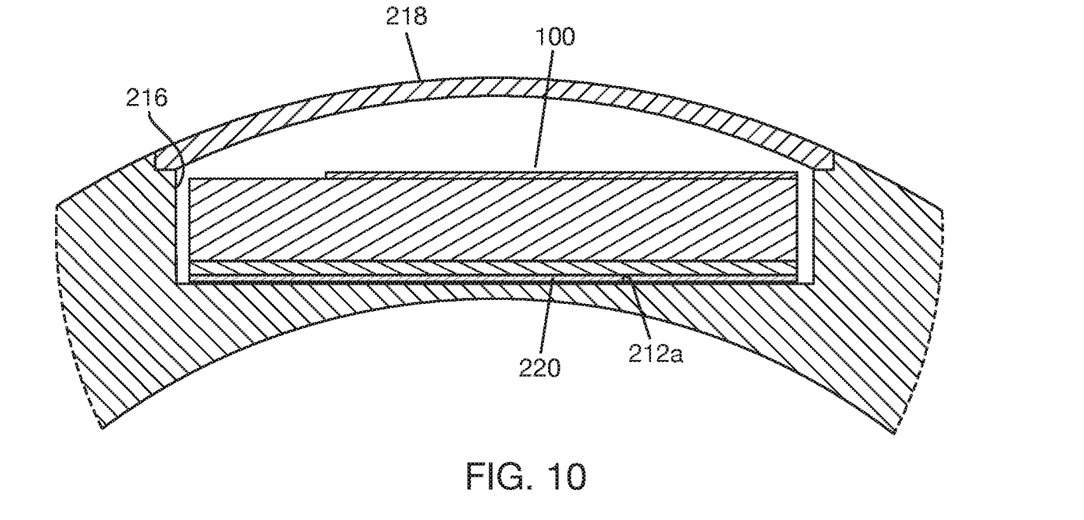
FIG. 10 is a cross-sectional view of a portion of a wearable body including a cavity containing a wearable antenna and a cover mounted over the cavity.
Figure 11:
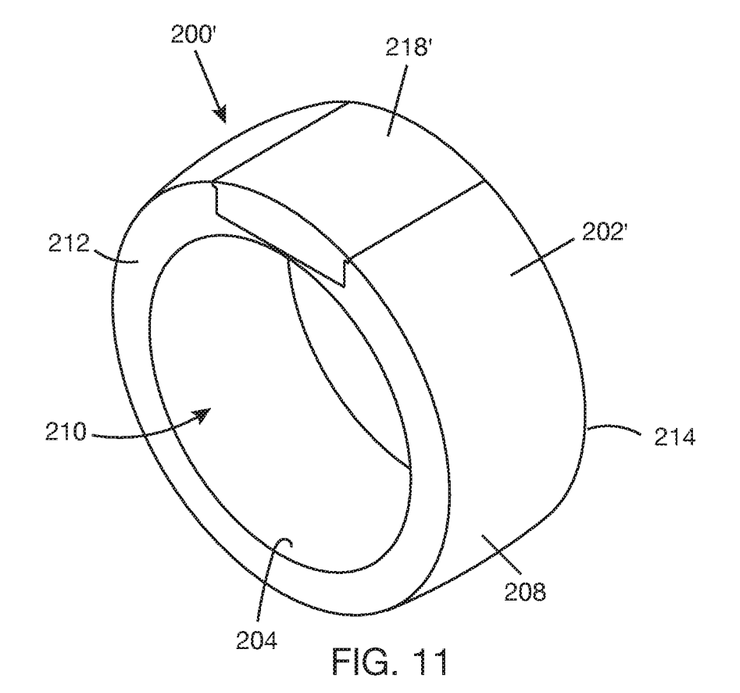
FIG. 11 is an isometric view of a wearable having a ring-shaped wearable body, a wearable antenna disposed in a cavity in the wearable body, and a cover mounted over the cavity.

FIGS. 9 and 10 show a cover body 218 mounted over cavity 216 (in FIG. 6). Similarly, FIG. 11 shows a cover body 218' mounted over cavity 216' (in FIG. 7). Cover body 218 (218') may be attached to wearable body 202 (202') using any suitable method. Preferably, cover body 218 (218') is made of electrically non-conductive material that is permeable to radio waves in at least the operation frequency range of wearable antenna 100. Cover body 218 (218') may be opaque, transparent, or semi-transparent in visible light. The material of cover body 218 (218') may be selected or finished such that cover body 218 (218') appears similar to, or is practically indistinguishable, from wearable body 202. Cover body 218 (218') may incorporate decorative elements, such as engravings and the like.

Figure 12:
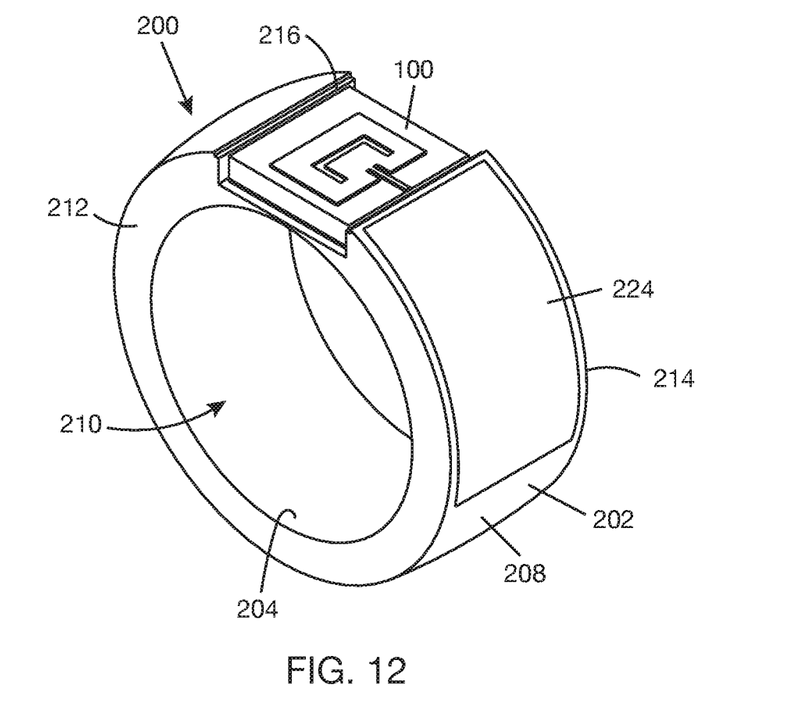
FIG. 12 is an isometric view of a wearable having a ring-shaped wearable body carrying a wearable antenna and a touch pad.
Figure 13:
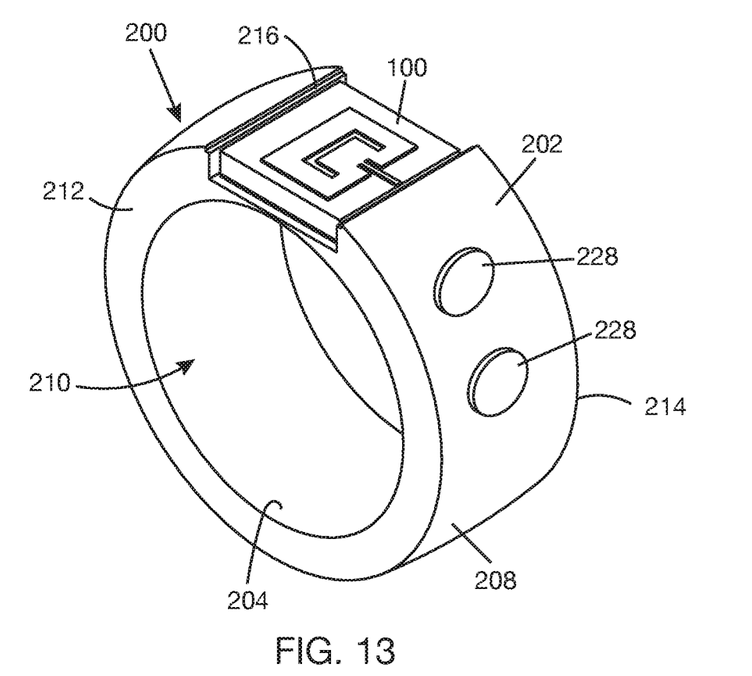
FIG. 13 is an isometric view of a wearable having a ring-shaped wearable body carrying a wearable antenna and push buttons.
Figure 14:
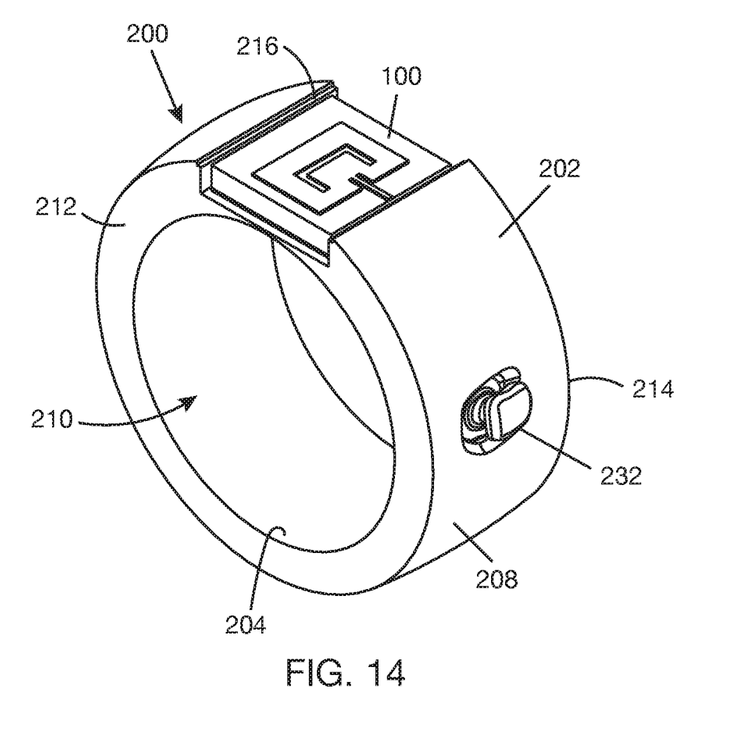
FIG. 14 is an isometric view of a wearable having a ring-shaped wearable body carrying a wearable antenna and a joystick.

One or more input devices may be integrated into wearable body 202 to enable wearable 200 to function as a wearable input device that receives inputs from a user. The input devices may be touchpad, push button, joystick, or the like. For example, FIG. 12 shows a touchpad 224 integrated with wearable body 202. FIG. 13 shows push buttons 228 integrated with wearable body 202. FIG. 14 shows a joystick 232 integrated with wearable body 202. The joystick 232 may generate signals indicative or representative of a relative position or orientation of the joystick 232 as the joystick is positioned in various positions or orientations. Touchpad 224 may be based on capacitive or resistive touch sensor technology. The touchpad 224 may generate signals indicative or representative of a relative position or orientation or movement of a pointing element (e.g., finger or stylus) along the touchpad 224. Although not shown in FIGS. 12-14, a cover body 218 (in FIG. 9) may be mounted over cavity 216 to hide wearable antenna 100. A user can insert an index finger through the opening 210 of wearable body 202 and touch or manipulate the input device(s) 224, 228, 232 using the thumb next to the index finger.

Wearable antenna 100 having the properties described above can be made small enough to fit into any standard ring size. With wearable antenna 100 insulated from wearable body 202, wearable body 202 can be made of material that would normally be used for jewelry, such as tungsten, titanium, cobalt, stainless steel, gold, and the like.

Figure 15:
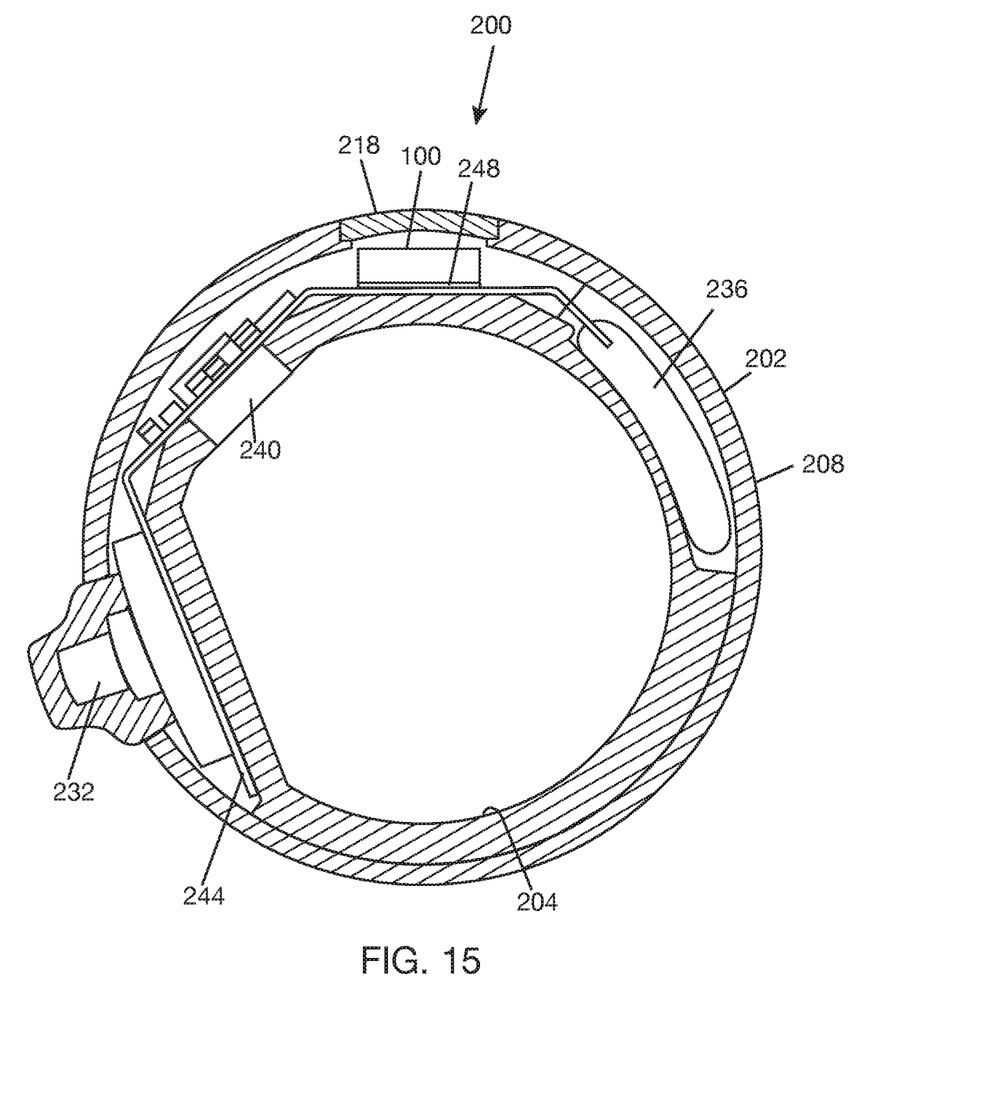
FIG. 15 is a cross-sectional view of a wearable body carrying a wearable antenna and an electronics module.

FIG. 15 shows that wearable body 202 may carry a portable power source 236, e.g., a battery or a supercapacitor, for power storage. Portable power source 236 may provide power to support operation of wearable antenna 100 and input devices(s) (224, 228, 232 in FIGS. 12-14). Wearable body 202 may carry a connector receptacle 240 through which the portable power source may be charged. An example of a suitable connector receptacle is described in U.S. patent application Ser. No. 16/216,502 ("Magnetic Connector System"). Connector receptacle 240 may be coupled to portable power source 236 through a flexible printed circuit board 244. The flexible PCB 244 may carry a microcontroller and other related processing electronics. The ground plane (120 in FIG. 1) and patch feed line (128 in FIG. 1) of wearable antenna 100 may be electrically coupled to flexible printed circuit board (PCB) 244. For example, a pressure-sensitive adhesive layer 248 having electrically conductivity in the Z axis, i.e., along the thickness of the adhesive layer, may be disposed between wearable antenna 100 and flexible PCB 244 to enable interconnection between wearable antenna 100 and flexible PCB 244. Similarly, any input device carried by wearable body 202, such as input device 232 that is shown for illustrative purposes, may be electrically coupled to flexible printed circuit board 244.

Wearable antenna 100 is not limited to use in a wearable or a wearable input device having a ring form factor. For example, wearable antenna 100 may be used in smart watches or wearables having a wristband form factor in general, in smart textiles, and in other wearables that require a compact antenna with good antenna efficiency.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. An antenna module, comprising:
    an antenna configured to be attached to an outer surface of a wearable body, the antenna comprising:
        a microwave dielectric substrate having first and second opposing major surfaces;
        an electrically conductive patch disposed on the first major surface of the microwave dielectric substrate;
        a feed line electrically coupled to a feed point of the electrically conductive patch;
        an electrically conductive ground plane positioned on a far side of the second major surface relative to the first major surface of the microwave dielectric substrate; and
        a container made of an electrically non-conductive material, wherein the container encloses the microwave dielectric substrate, the electrically conductive patch, and the electrically conductive ground plane such that the container electrically insulates the microwave dielectric substrate, the electrically conductive patch, and the electrically conductive ground plane from the wearable body when the antenna is attached to the outer surface of the wearable body.

2. The antenna module of claim 1, wherein the electrically non-conductive material comprises a plastic material.

3. The antenna module of claim 2, wherein at least a portion of the wearable body comprises a metal.

4. The antenna module of claim 2, wherein the antenna is configured to be disposed in a cavity of the wearable body.

5. The antenna module of claim 4, wherein the antenna module is configured to be disposed between the wearable body and a cover and wherein the cover comprises an electrically non-conductive material and is permeable to radio waves in at least an operation frequency range of the antenna.

6. The antenna module of claim 1, wherein the microwave dielectric substrate comprises a microwave dielectric ceramic.

7. The antenna module of claim 1, wherein the microwave dielectric substrate has a relative permittivity in a range from 90 to 120.

8. The antenna module of claim 1, wherein the antenna operates at a frequency in a range from 2.4 to 2.48 GHz.

9. The antenna module of claim 1, wherein the microwave dielectric substrate has a width in a range from 2 mm to 8 mm and a length in a range from 2 mm to 8 mm.

10. The antenna module of claim 1, wherein the electrically conductive patch includes a U-shaped slot, and wherein the feed line is a microstrip feed line.

11. The antenna module of claim 1, wherein the electrically conductive ground plane is carried on the second major surface of the microwave dielectric substrate.

12. An antenna module, comprising:
    an antenna configured to be attached to an outer surface of a wearable body, the antenna comprising:
        a microwave dielectric substrate having first and second opposing major surfaces;
        an electrically conductive patch disposed on the first major surface of the microwave dielectric substrate, the electrically conductive patch having a feed point and a U-shaped slot;
        a feed line connected to the feed point of the electrically conductive patch;
        an electrically conductive ground plane disposed on a far side of the second major surface relative to the first major surface of the microwave dielectric substrate; and
        an adhesive material disposed so as to provide an electrically insulating layer between the antenna and the surface of the wearable body when the antenna is attached to the outer surface of the wearable body.

13. The antenna module of claim 12, wherein the microwave dielectric substrate is a microwave dielectric ceramic.

14. The antenna module of claim 12, wherein the microwave dielectric substrate has a relative permittivity in a range from 90 to 120.

15. The antenna module of claim 12, wherein the antenna is configured to be disposed between a cavity of the wearable body and a cover, wherein the cover comprises an electrically non-conductive material and is permeable to radio waves in at least an operation frequency range of the antenna.

16. The antenna module of claim 12, wherein the antenna is configured to be disposed in a cavity of the wearable body such that the antenna is further insulated from the outer surface of the wearable body by at least one of an electrically non-conductive material and an air gap.

17. The antenna module of claim 12, further comprising a container made of an electrically non-conductive material, wherein the microwave dielectric substrate, the electrically conductive patch, and the electrically conductive ground plane are enclosed in the container.

18. The antenna module of claim 12, further comprising an electrically non-conductive coating film disposed on exposed surfaces of at least the electrically conductive patch and the electrically conductive ground plane.

19. The antenna module of claim 12, wherein the electrically conductive ground plane is carried on the second major surface of the microwave dielectric substrate.

* * * * *